US007043579B2

(12) United States Patent
Dhong et al.

(10) Patent No.: US 7,043,579 B2
(45) Date of Patent: May 9, 2006

(54) RING-TOPOLOGY BASED MULTIPROCESSOR DATA ACCESS BUS

(75) Inventors: Sang Hoo Dhong, Austin, TX (US); Harm Peter Hofstee, Austin, TX (US); John Samuel Liberty, Round Rock, TX (US); Peichun Peter Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 10/313,741

(22) Filed: Dec. 5, 2002

(65) Prior Publication Data

US 2004/0111546 A1  Jun. 10, 2004

(51) Int. Cl.
*G06F 13/00* (2006.01)
(52) U.S. Cl. ............... 710/107; 710/100; 710/117; 710/105
(58) Field of Classification Search ................ 710/100, 710/52, 240–244, 107; 713/400; 711/137; 709/251; 370/362
See application file for complete search history.

(56) References Cited

U.S. PATENT DOCUMENTS

| | | | |
|---|---|---|---|
| 4,933,836 A | | 6/1990 | Tulpule et al. |
| 4,979,096 A | | 12/1990 | Ueda et al. |
| 5,119,481 A | | 6/1992 | Frank et al. |
| 5,359,716 A | | 10/1994 | Igarashi |
| 5,361,637 A | | 11/1994 | Judd et al. |
| 5,432,909 A | * | 7/1995 | Cok ............................ 709/251 |
| 5,551,048 A | | 8/1996 | Steely, Jr. |
| 5,778,202 A | | 7/1998 | Kuroishi et al. |
| 5,949,755 A | * | 9/1999 | Uphadya et al. ............. 370/224 |
| 6,101,321 A | * | 8/2000 | Cok et al. .................... 709/251 |
| 6,122,285 A | * | 9/2000 | Okada ........................ 370/450 |

(Continued)

FOREIGN PATENT DOCUMENTS

EP          0 610 938 A1    8/1994

(Continued)

OTHER PUBLICATIONS

Bandat, K. and Izbicki, H.; "Sequentialization of Asynchronous Processors"; *IBM Technical Disclosure Bulletin*; May 1972; vol. 14, No. 12; pp. 3796-3797.

*Primary Examiner*—Tim Vo
*Assistant Examiner*—Kim T. Huynh
(74) *Attorney, Agent, or Firm*—Carr LLP; Diana R. Gerhardt

(57) ABSTRACT

The present invention provides a data access ring. The data access ring has a plurality of attached processor units (APUs) and a local store associated with each APU. The data access ring has a data command ring, coupled to the plurality of APUs. The data command ring is employable to carry indicia of a selection of one of the plurality of APUs to the APUs. The data access ring also has a data address ring, coupled to the plurality of APUs. The data address ring is further employable to carry indicia of a memory location to the selected APU a predetermined number of clock cycles after the data command ring carries the indicia of the selection of one of the plurality of APUs. The data access ring also has a data transfer ring, coupled to the plurality of APUs. The data transfer ring is employable to transfer data to or from the memory location associated with the APU a predetermined number of clock cycles after the data address ring carries the indicia of the memory location to the selected APU.

21 Claims, 4 Drawing Sheets

U.S. PATENT DOCUMENTS

| | | |
|---|---|---|
| 6,243,794 B1 * | 6/2001 | Casamatta .................. 711/153 |
| 6,253,292 B1 | 6/2001 | Jhang et al. |
| 6,457,102 B1 * | 9/2002 | Lambright et al. ......... 711/129 |
| 6,697,884 B1 * | 2/2004 | Katsch ....................... 710/18 |
| 6,839,808 B1 * | 1/2005 | Gruner et al. .............. 711/130 |
| 2003/0212830 A1 * | 11/2003 | Greenblat et al. .......... 709/251 |
| 2004/0252682 A1 * | 12/2004 | Brueckner et al. .......... 370/362 |

FOREIGN PATENT DOCUMENTS

| | | |
|---|---|---|
| JP | 9044464 | 2/1997 |

\* cited by examiner

RING-TOPOLOGY BASED MULTIPROCESSOR DATA ACCESS BUS

TECHNICAL FIELD

The invention relates generally to a data bus and, more particularly, to a ring-topology based data bus.

BACKGROUND

Computer buses are generally employed to transfer data between a plurality of elements in a computer system, such as between a microprocessor and RAM, or from a floppy disk drive to a cache. Efficiently designed bus architecture is of increasing concern as the processing speeds of the elements coupled by the buses, such as a processor and a coprocessor, continue to increase. A limiting factor of computer system operation can be the effective rate of data transfer across buses. In some systems, the processing elements processes data faster than the data can be transferred to the processing element.

One form of bus architecture comprises a ring topology. Generally, in a ring topology, information, which can comprise both commands to the processing elements and data employed by the processing elements, is passed from PE to PE in a circular manner.

However, there are disadvantages associated with conventional ring topology. For instance, in conventional systems, a processing element (PE) employed in a data transfer can be unavailable to participate in the transfer of other data between the PE and the ring bus. This unavailability can be from the time a command to perform the data transfer is received by the PE until the time the associated data is transferred between the PE and the ring bus. This unavailability can comprise a number of computer clock cycles.

Furthermore, in a bus system that employs attached processor units (APUs) in a bus ring topology, bandwidth is important. In other words, the ability to have a large amount of data passed at any one time in parallel from APU to APU is a design consideration. In other microprocessing systems that do not employ a ring topology with APUs, latency is more of a concern.

Therefore, a need exists for a bus ring architecture that overcomes at least some of the deficiencies of conventional systems.

SUMMARY

The present invention provides a data access ring. The data access ring has a plurality of attached processor units (APUs) and a local store associated with each APU. The data access ring has a data command ring, coupled to the plurality of APUs, employable to carry indicia of a selection of one of the plurality of APUs. The data access bus has a data address ring, coupled to the plurality of APUs, the data address ring employable to carry indicia of a memory location to the selected APU a predetermined number of clock cycles after the data command ring carries the indicia of the selection of one of the plurality of APUs. The data access ring also has a data transfer ring, coupled to the plurality of APUs, the data transfer ring employable to transfer data to or from the memory location associated with the APU a predetermined number of clock cycles after the data address ring carries the indicia of the memory location to the selected APU.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
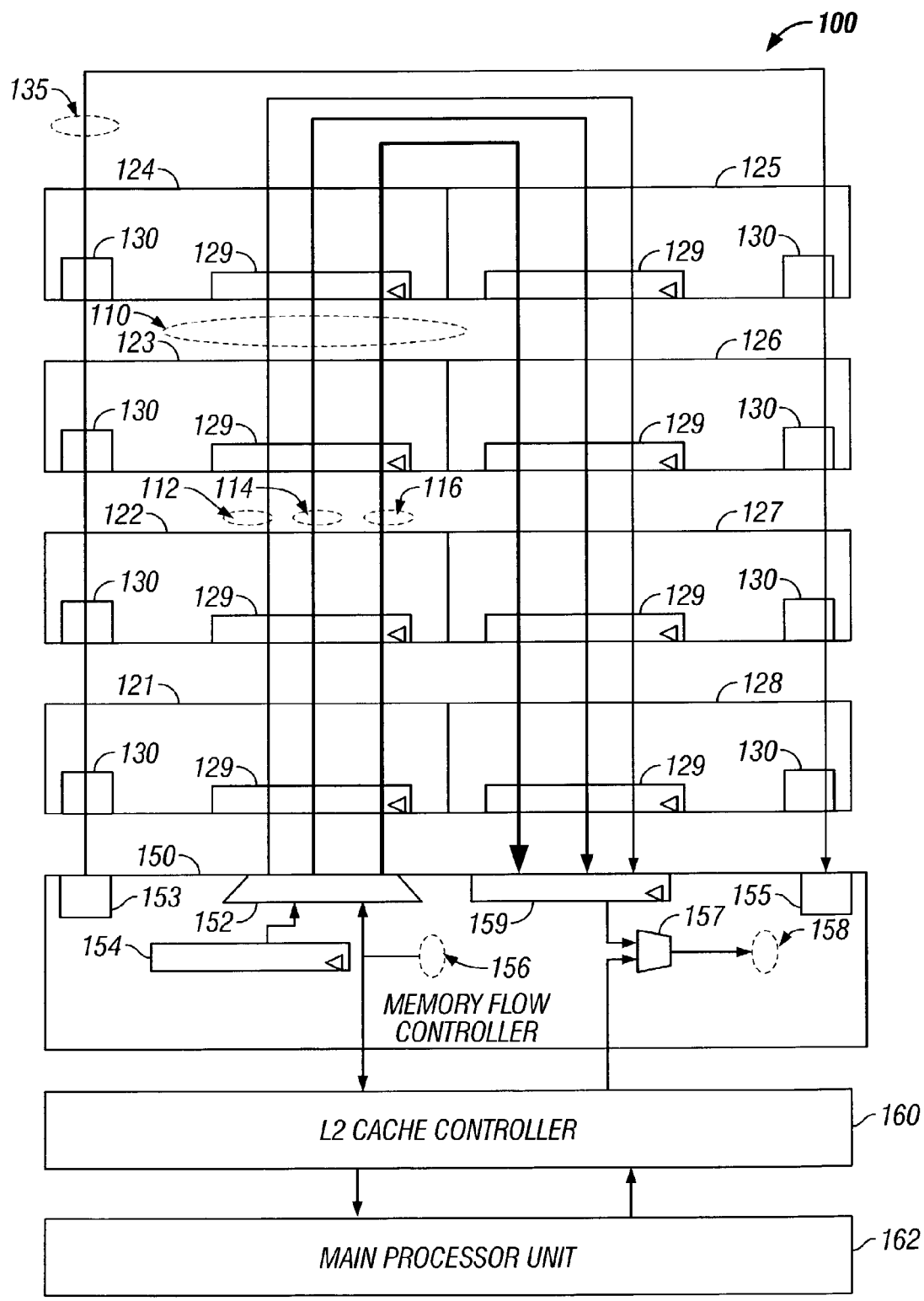
FIG. 1 schematically depicts a ring topology data access bus.

Referring to FIG. 1, the reference numeral 100 generally designates a bus ring system ("system") 100. The system 100 comprises a data access ring 110 coupled to a plurality of attached processor units (APUs) 121–128. In one embodiment, the APU comprises a synergistic processing unit (SPU®). In the illustrated embodiment of FIG. 1, eight APUs are coupled to the data access ring 110, although those of skill in the art understand that other numbers of APUs are within the scope of the present invention. In one embodiment, the data access ring 110 is 576 bits wide. Each APU 121–128 is associated with a latch 129, also known as a local store, in which data bubbles can be stored and processed, and received and transmitted in one clock cycle. A data bubble can be generally defined as a plurality of bytes received in parallel by a processor in a computer clock cycle. A local store can be generally defined as a memory storage area inside the APU 121–128. In one embodiment, the local store has only one port. In other words, there is only one access performed (either read or write from either the data bus 110 or the APU 121–128) per cycle.

The data access ring 110 is coupled to a memory flow controller (MFC) 150. Generally, the MFC coordinates the transferences of information on and off of the data access ring 110. The MFC 150 comprises a multiplexer (MUX) 152 and a register 159. The MUX 152 accepts input from a data conveyer 154 and a chip interface (CPIF) 156. Generally, the data conveyer 154 takes overwritten but valid data from an L2 cache (not shown) and then sends it to the APUs 121–128 when this data is requested. The CPIF 156 receives data and instructions from outside the system 100, such as from a second main processor unit. The information from the data conveyer 154 and the CPIF 156 is transmitted to the MUX 152, wherein it is multiplexed by the MUX 152 and placed upon the appropriate sub ring 112–116. Data which is not to be processed by the SPUs 121–128 is instead passed through a cache controller, such as the L2 cache controller 160, to a main processor unit 162.

The MFC 150 further comprises an APU command generator ("generator") 153, coupled to an APU command ring 135. The APU command ring 135 is coupled to each APU 121–128 of the system 100. The information from the APU command ring 135 is then input into the APU command receiver 155. Generally, the APU generator 153 generates signals to enable and disable each APU 121–128. The APU command ring 135 can be used for transmitting APU data requests for the MFC 150 to process. It can also be used for inter-processor communication and for the configuration and control of the APU 121–128. In one embodiment, the APU command ring bus 135 comprises 77 bits lines in parallel.

The data access ring 110 is also coupled to a register 159 of the MFC 150. Generally, the register 159 receives information from all three bus subrings, the rings 112, 114, and 116, and then passes information from the data ring 116 to the MUX 157. The MUX 157 receives processed information from the L2 cache controller 160 and the register 159, and sends the data off chip through the CPIF 158.

Generally, the data command ring 112 identifies which APU 121–128 is targeted for an information transfer into or out of its local store 129, and whether the command is a write into the local store 129 or a read from the local store 129. This command is received by the MUX 152 and passed on the data command ring 110.

Each clock cycle, the issued data command is incremented from APU 121, APU 122, APU 123, and so forth, on the command ring 112. On each new computer clock cycle, each APU 121–128 examines the data command that has been pipelined to it to determine whether that data command is targeted to that APU. Generally, a receipt of commands upon the command bus 112 a predetermined number of clock cycles before either receiving or transmitting the data to or from the data transfer bus 116 allows the APU 121–128 to schedule access to its internal local store and can prevent conflict between APU 121–128 program access to the internal local store and data transfer ring 116 access to the local store. In one embodiment, this reduces the access points employed by the local store, thus allowing for a smaller unit and more efficient APU performance. In one embodiment, more efficient APU performance can arise because the APU can process information in its local store while it is waiting the predetermined number of computer clock cycles until the transfer data arrives from the data transfer ring 116.

For instance, a data command is targeted for APU 122. The first clock cycle, APU 121 examines the data command to determine if APU 121 is the targeted APU. APU 121 determines that it is not the targeted APU, so APU 121 takes no action regarding this command. In the next cycle, the command is forwarded to APU 122. This is the targeted APU, so APU 122 takes note of this, and prepares to receive a data address on the data address bus a predetermined number of cycles later. In one embodiment, the number of predetermined cycles is four clock cycles. The next clock cycle, APU 123 examines the command on the data command ring 110, determines that it is not the targeted APU, and takes no action regarding this command. The data command continues through the data command ring 112 until it has been examined by all the APUs 121–128 on the ring. The command is then deposited into the MFC 150. In one embodiment, the data command ring is 5 bits wide, and comprises a "valid" bit, a read and write bit ("RD/WR") and a 3 bit APU target indicia. Generally, a valid bit is a signal bit that indicates that this particular request is valid. If the valid bit is off, then the request ID is not valid and no action is to be taken by any APU 121–128. In other words, the 3 bit APU target indicia is read by each APU 121–128 to determine which APU 121–128 is the targeted APU.

In a further embodiment, separate data commands are placed on the data command ring 112 for a plurality of sequential clock cycles. For example, in a first clock cycle, a data command is targeted for processor 124 and is input onto the bus ring 112. In a second clock cycle a data command targeted for processor 128 is placed on the bus ring 112, and in a third clock cycle, a data command targeted for processor 122 is placed on the data command ring 112. Each of these data commands are sequentially presented to each APU 121–128. If targeted, the APU 121–128 prepares to receive a data address a predetermined number of clock cycles later. In one embodiment, the predetermined number of clock cycles is four clock cycles.

The predetermined number of computer clock cycles later, the address bus 114 has input onto it the local store address that is to be employed by the targeted APUs 121–128. In another embodiment, the data address ring 114 is 11 bits wide. The targeted APU receives this address when the data address has been pipelined to it, and will employ this data address to transfer data between the data transfer ring 116 and the local store 129 another predetermined number of clock cycles later. However, the APUs 121–128 that are not the targeted APU do not access this data address ring 114 information. In one embodiment, the number of predetermined clock cycles is four.

The data address on the data address ring 114 can comprise either the memory location from which the processed data is to be loaded to the data transfer ring 116 from the local store, or the location to which unprocessed data is to be loaded to the local store. In one embodiment, the selected APU will perform the requisite read or write based upon the RD/WR bit received a predetermined number of cycles ago.

Then, in one embodiment, in a second number of predetermined cycles, there is a data transfer between the local store and the data transfer bus 116. If the data is transferred from the local store to the transfer data bus, the transfer data bus has a reserved bus allocation space to receive the processed bus data. Then, this data is passed to the latch 159, which is then passed through the MUX 157 to the CPIF 158.

In one embodiment, at the bus cycle in which the selected APU 121–128 receives the data command, the targeted APU issues an instruction to itself that it shall not access its local store at the predetermined clock cycle in which the local store is to transfer data between itself and the data transfer bus 116. In one embodiment, eight bus cycles are between the targeted APU determining that it is targeted and the transfer of the data on the data transfer bus 116.

In a further embodiment, each bus 112, 114, 116 is employed for a plurality of sequential bus cycles. There are staggered commands placed on each sub bus line. For instance, in a ninth sequential computer cycle, an APU receives the ninth data command, the fifth data address, and the bus space allocated for the first transfer data. In a tenth sequential computer cycle, an APU receives the tenth data command, the sixth data address, and the bus space allocated for the second transfer data. Such a pipelining allows for data to be either inserted or received from the bus every bus cycle, thereby, in one embodiment, creating a continuous embodiment of a 512 bits bandwidth data transfer. Typically, the MFC 180 can generate these staggered control signals using logic methods such as state machines, sequences, and so on.

Figure 2:
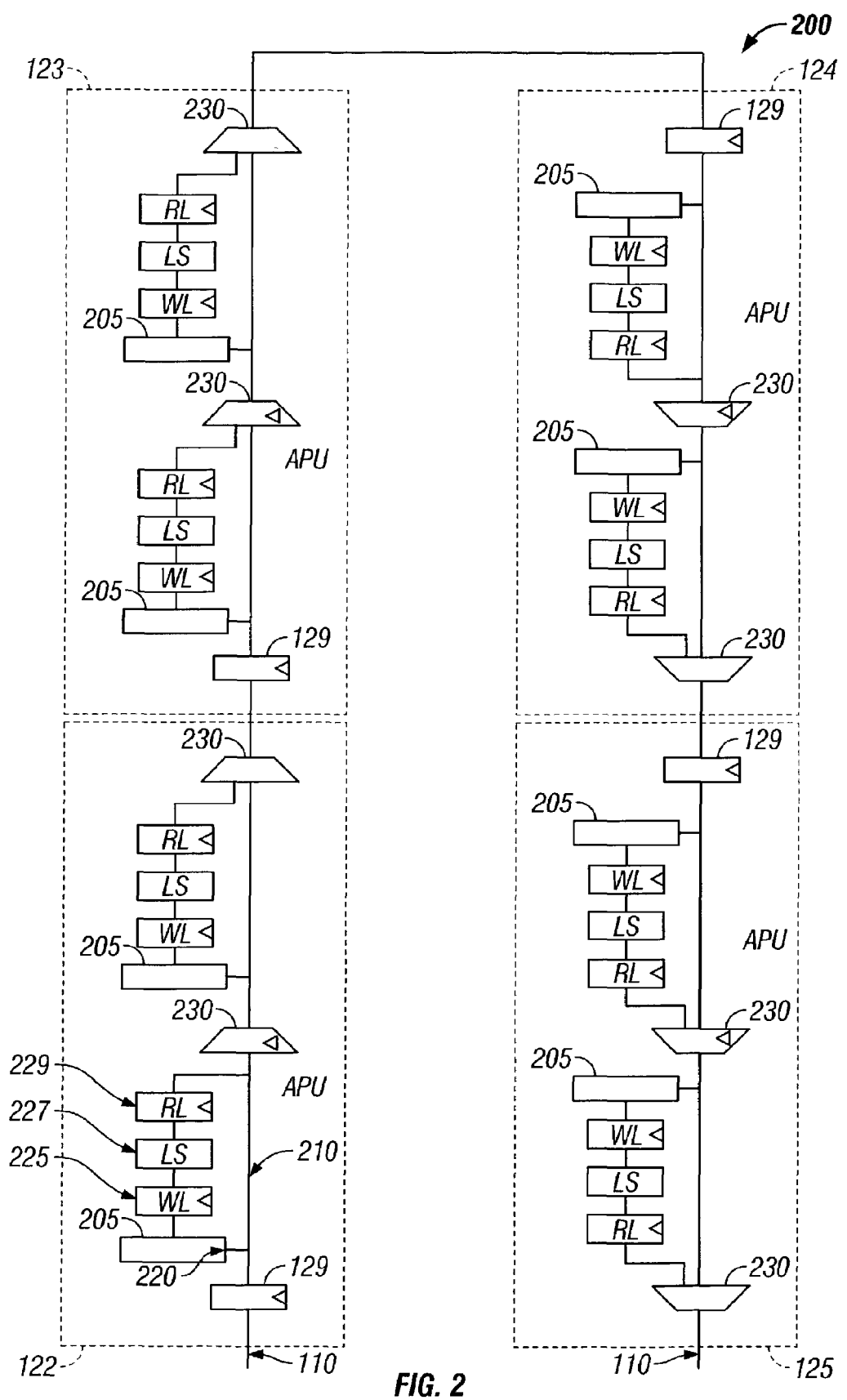
FIG. 2 schematically depicts a plurality of coupled APUs of the ring topology data access bus.

Turning now to FIG. 2, disclosed are APUs 122–125. In each APU, there is a register 129 employable for storing bus 110 information for one clock cycle. Within each APU, the incoming data access ring 110 is split into two parallel transmission paths, path 210 and path 220. Path 210 leads directly into a MUX 230. For the path 220, there is coupled a data controller (DC) 205. The DC 205 controls a coupled write register 225, a first local store 227, and a read register 229. In one embodiment, the first local store comprises 64K bits of memory. In FIG. 2, the DC 205 reads the data command ring 112 to determine whether the APU ID matches the ID of its associated APU. If no match, the DC 205 blocks the transmission further down the path 220. However, if the APU index does match, then the DC 205 determines whether it is a read request or a write request.

In the predetermined number of computer cycles later, the write register 225 accesses the data address bus 114 to determine the local store address at which the data transfer shall take place. In one embodiment, the amount of data to be transferred comprises the bus width of the data transfer bus 116.

In the next number of predetermined number of computer cycles later, the DC 205 then either employs the data transfer ring 216 to either transfer data to the write latch 225, and hence to the local store 227, or from the local store 227 through employment of the read latch 229. If the data is from the read latch 229, this data is put on the data transfer bus 116 to be passed around the bus ring 110 until being received by the receiver of the MFC 150 for transmission through the CPIF 158.

In the illustrated embodiment, although the local store is portrayed as split into two physically distinct, although logically contiguous, entities within an APU, those of skill in the art understand that the local store 227 can be a single or a plurality of functionally interconnected local stores. Also, although two DCs 205 are illustrated per APU, in another embodiment, one data controller 205 is employed. In FIG. 2, each data controller 205 examines the pipelined information on the data command bus 112 to determine whether to access the data address bus 114 and the data transfer bus 116 the requisite number of cycles later.

Figure 3A:
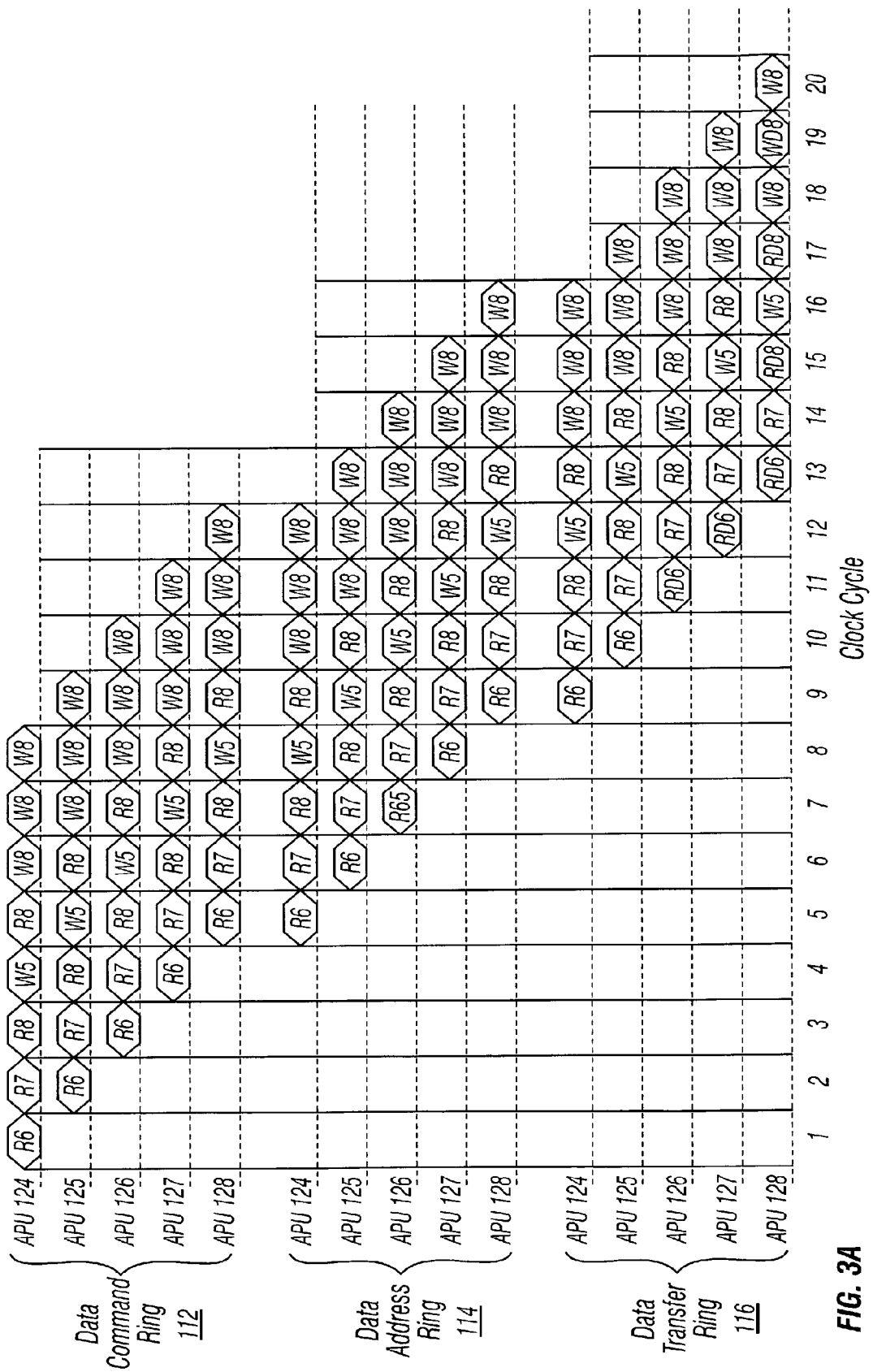
FIG. 3 is a timing diagram of information conveyed on the ring topology data access bus.

Turning now to FIG. 3, illustrated is a data access ring 110 timing diagram. Generally, FIG. 3 illustrates a sequence of data commands sent through the data command ring 112, addresses sent through the data address ring 114, and data or buffers for data on the data transfer ring 116. Although the timing diagram is illustrated as starting on clock cycle 1, this is for the purposes of illustration, and another clock starting cycle time can be used. The sequences can be such sequences as RRRRWWWW or RRWWRRWW. In the illustrated embodiment, a random sequence such as RRRWRWWW is used, as is illustrated in FIG. 3. However, other such patterns are within the scope of the present invention.

In clock cycle 1, the APU 124 reads a command on the data command ring. This command is a read command from APU 126, and is therefore ignored by APU 124.

In clock cycle 2, the APU 124 reads a second command on the data command ring, which is targeted as a read to APU 127, and is also ignored. The read command has been pipelined to APU 125, which ignores the command, as it is a read command to APU 126.

In clock cycle 3, the APU 124 reads the read command for APU 128, so it is ignored. APU 125 reads a read command to APU 127, and is ignored. However APU 126 reads a read request to APU 126, and this command is not ignored. Because it is a read request, the APU 126 reads from the data address ring 114 the data address to which the data is to be written to the local store in four clock cycles, in clock cycle 7. Clock cycles 4, 5, 6, 7, and 8 each have further read or write commands placed on the data command ring 112. No more commands are placed on the data command ring 112 after clock cycle 8.

In clock cycle 5, the APU 124 receives a data address on the data address ring. However, the APU 124 ignores this data address because four cycles ago the APU 124 was not commanded to read or write data to or from its associated local store. In clock cycle 6, the APU 124 and APU 125 both ignore received data addresses because APU 124 and APU 125 were not targeted by the data command four cycles ago.

However, in clock cycle 7, APU 126 reads the data address received from the data address bus 114, as the APU 126 received and recognized the targeted command to the APU 126 four cycles ago from the data command ring 112. This data address is the data address to be accessed within the local store. Clock cycles 8, 9, 10, 11, and 12 each have further addresses placed on the data address ring 114. No more commands are placed on the data address ring 114 after clock cycle 12.

In clock cycle 9, the APU 124 receives a data transfer or a space for data transfer on the data transfer ring 116. However, the APU 124 ignores this data transfer because eight cycles ago the APU 124 was not commanded to read or write data to or from its associated local store. In clock cycle 10, the APU 124 and APU 125 both ignore received data transfers or data transfer holes because APU 124 and APU 125 were not targeted by the data command eight cycles ago.

However, in clock cycle 11, APU 126 extracts the data received from the data transfer bus 116, as the APU 126 received and recognized the targeted command to the APU 126 eight cycles ago from the data command ring 112. This data address is the data address to be accessed within the local store. Clock cycles 12, 13, 14, 15, and 16 each have further data or data holes placed on the data transfer ring 116. No more data or data holes are placed on the data transfer ring 164 after clock cycle 16.

Figure 4:
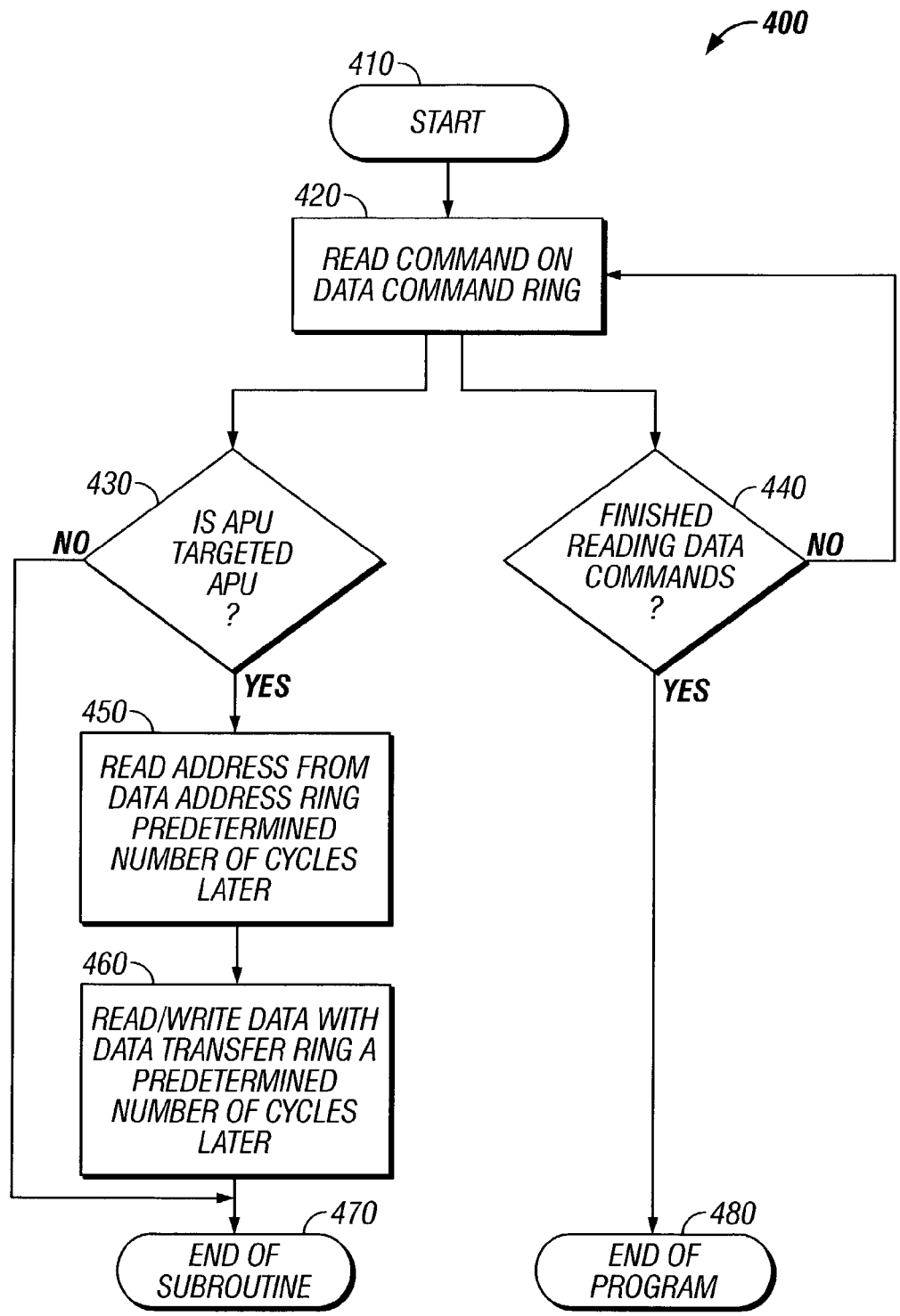
FIG. 4 illustrates a method of employment of the ring topology data access bus.

Turning now to FIG. 4, disclosed is a method 400 for employing the data bus ring 100. After step start 410, an APU 121–128 reads the data command ring for a given computer clock cycle in step 420. After step 420, two separate processes execute substantially in parallel. The first process begins with step 430, and the second process begins with step 440.

In step 430, the APU 121–128 determines whether the data command ring 112 is targeted at that APU. If the command does not target that APU, subroutine stop step 470 occurs, and this parallel path ends.

However, if the APU 121–128 is the target APU, the targeted APU reads the data address from the bus address ring 114 a predetermined number of computer clock cycles later in step 450. In one embodiment, these are four computer clock cycles later.

In step 460, the targeted APU then either reads data from the data transfer ring 116 or writes the processed data to the data transfer ring 116, a second number of predetermined number of cycles later. In one embodiment, these are four bus cycles later. Then subroutine stop step 470 occurs, and this parallel path ends.

In step 440, the APU 121–128 determines if the APUs 121–128 are finished reading data commands. If they are finished, then end step 480 executes. If not, then the next command on the command ring 112 is read and the next computer clock cycle occurs.

It is understood that the present invention can take many forms and embodiments. Accordingly, several variations may be made in the foregoing without departing from the spirit or the scope of the invention. For example, different over-the-air communications standards may be implemented, and the like.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A data access ring system having a plurality of attached processor units (APUs), a local store associated with each APU, and a fixed timing protocol, comprising:
a data command ring, coupled to the plurality of APUs, employable to carry indicia for a data packet of a selection of one of the plurality of APUs, wherein a data transmission may comprise multiple data packets;
a data address ring, coupled to the plurality of APUs, the data address ring employable to carry indicia of a memory location for each data packet to the selected APU a predetermined number of clock cycles set by the fixed timing protocol after the data command ring carries the indicia of the selection of one of the plurality of APUs; and
a data transfer ring, coupled to the plurality of APUs, the data transfer ring employable to transfer each data packet to or from the memory location associated with the APU a predetermined number of clock cycles set by the fixed timing protocol after the data address ring carries the indicia of the memory location to the selected APU.

2. The data access ring system of claim 1, wherein each APU of the plurality of APUs is configured to accept the indicia of the memory location from the data address ring a predetermined number of cycles after receiving indicia that the APU is the selected APU.

3. The data access ring system of claim 1, wherein each APU of the plurality of APUs is configured to transfer data to or from the data transfer ring a predetermined number of cycles after receiving indicia of the memory location, if the APU is the selected APU.

4. The system of claim 1, wherein the memory location comprises a memory location within the local store associated with the selected APU.

5. The system of claim 1, wherein the local store can either transmit or receive data between the local store and the APU, or transmit or receive data between the local store and the data transfer ring.

6. The system of claim 5, wherein the APU is employable to issue a no operation command upon receipt of a command that the APU is the targeted APU.

7. The system of claim 5, wherein the APU is employable to schedule exclusive access to the local store between either a program running in the APU or the data transfer ring.

8. The system of claim 1, wherein both of the predetermined number of computer clock cycles comprises four predetermined clock cycles.

9. The system of claim 1, further comprising a memory flow controller employable to place data on the data transfer ring and read information from the data command ring.

10. The system of claim 9, further comprising a command ring coupled between the memory flow controller and the plurality of APUs.

11. The system of claim 1, wherein the plurality of APUs comprises eight APUs.

12. A method of employing a ring bus by utilizing a fixed timing protocol, comprising:
transmitting indicia for a data packet of a selected APU, wherein a data transmission may comprise multiple data packets;
transmitting indicia of a memory address for each data packet associated with the selected APU after a first predetermined number of clock cycles set by the fixed timing protocol; and
transmitting or receiving each data packet to or from the memory address associated with the targeted APU after a second predetermined number of clock cycles set by the fixed timing protocol.

13. The method of claim 12, wherein the step of transmitting or receiving data to or from the memory address associated with the targeted APU further comprises accessing a local store.

14. The method of claim 12, wherein the first predetermined number of clock cycles comprises four clock cycles.

15. The method of claim 12, wherein the second predetermined number of clock cycles comprises four clock cycles.

16. The method of claim 12, wherein the step of transmitting an indicia of a targeted APU further comprises transmitting a read or write command.

17. A method of employing a bus utilizing a fixed timing protocol, comprising:
receiving indicia for a data packet of a selection of one of a plurality of APUs, wherein a data transmission may comprise multiple data packets;
issuing a no access to local store command by the targeted APU;
receiving indicia of a memory location for each data packet by the selected APU after a first predetermined number of clock cycles set by the fixed timing protocol; and
transmitting or receiving each data packet from the memory location after a second predetermined number of clock cycles set by the fixed timing protocol.

18. The method of claim 17, wherein the step of transmitting or receiving data from the memory location after a second predetermined number of clock cycles further comprises accessing a local store.

19. The method of claim 17, wherein the step indicia of a targeting of one of a plurality of APUs further comprises receiving a read or write command.

20. A computer program product for employing a ring bus by utilizing a fixed timing protocol, the computer program product having a medium with a computer program embodied thereon, the computer program comprising:
computer code for transmitting indicia for a data packet of a selected APU, wherein a data transmission may comprise multiple data packets;

computer code for transmitting indicia of a memory address for each data packet associated with the selected APU after a first predetermined number of clock cycles set by the fixed timing protocol; and computer code for transmitting or receiving each data packet to or from the memory address associated with the targeted APU after a second predetermined number of clock cycles set by the fixed timing protocol.

21. A processor for employing a ring bus by utilizing a fixed timing protocol, the processor including a computer program comprising:

computer code for transmitting indicia for a data packet of a selected APU, wherein a data transmission may comprise multiple data packets;

computer code for transmitting indicia of memory address for each data packet associated with the selected APU after a first predetermined number of clock cycles set by the fixed timing protocol; and computer code for transmitting or receiving each data packet to or from the memory address associated with the targeted APU after a second predetermined number of clock cycles set by the fixed timing protocol.

* * * * *